United States Patent [19]
Laganis

[11] 3,974,115
[45] Aug. 10, 1976

[54] WATER-SOLUBLE WIRE ENAMEL
[75] Inventor: Deno Laganis, Schenectady, N.Y.
[73] Assignee: Schenectady Chemicals, Inc., Schenectady, N.Y.
[22] Filed: Dec. 27, 1974
[21] Appl. No.: 536,963

Related U.S. Application Data
[63] Continuation-in-part of Ser. No. 311,701, Dec. 7, 1972, abandoned.

[52] U.S. Cl. .................... 260/29.2 N; 260/29.6 NR; 260/860; 260/873; 428/378
[51] Int. Cl.$^2$ .................... C08L 67/02; C08L 73/00
[58] Field of Search ................. 260/29.2 N, 29.4 R, 260/29.6 NR, 850, 873, 860

[56] References Cited
UNITED STATES PATENTS

| | | | |
|---|---|---|---|
| 2,917,414 | 12/1959 | McLean | 260/75 T |
| 3,074,818 | 1/1963 | Lee | 117/128.4 |
| 3,108,083 | 10/1963 | Laganis | 260/29.4 R |
| 3,317,453 | 5/1967 | MacDonald et al. | 260/33.4 R |
| 3,406,045 | 10/1968 | Sattler | 117/128.4 |
| 3,518,326 | 6/1970 | Forsberg | 260/828 |
| 3,549,577 | 12/1970 | Stromberg | 260/29.4 R |
| 3,607,802 | 9/1971 | Sekmakas | 260/850 |
| 3,631,136 | 12/1971 | Spiller | 260/29.4 R |

OTHER PUBLICATIONS
Yanagisawa et al., (Dept. Develop., Froth Chem. Co., Japan) *Kobunshi Kako* (1970), 19(10), 610–618 (Japan).

*Primary Examiner*—Murray Tillman
*Assistant Examiner*—W. C. Danison, Jr.
*Attorney, Agent, or Firm*—Cushman, Darby & Cushman

[57] ABSTRACT

A composition is prepared which is useful in wire enamel, comprising (1) a water soluble polyester which is a condensation product of (a) a tribasic carboxylic acid, (b) an aliphatic or aromatic dicarboxylic acid and (c) a dihydric alcohol, (2) hydroxymethylated diacetone acrylamide as a crosslinking agent and a water soluble organic titanate.

22 Claims, No Drawings

WATER-SOLUBLE WIRE ENAMEL

This application is a continuation-in-part of application Ser. No. 311,701 filed Dec. 7, 1972 now abandoned.

The present invention relates to the composition of a water soluble polyester for use as a wire enamel or protective coating.

Water soluble trimellitic anhydride polyesters are known in the art. U.S. Patent to Bremmer, No. 3,070,256. However, an unmodified polyester with a nylon 6-6 top coat was found to be inadequate to provide both heat shock and cut-through properties that are required for a commercial class F magnet wire enamel. Without the nylon top coat, the heat shocks were even worse.

It has been discovered that use of hydroxymethylated diacetone acrylamide as a crosslinking agent improves the heat shock properties of the polyester coating. It has been further discovered that use of a water soluble organic titanate as a crosslinking agent in the polyester improves the cut-through values, but downgrades the heat shock properties. It has also been discovered that incorporation of both of these crosslinking agents unexpectedly improves both of the above-mentioned properties of the enamel coating.

It is an object of the present invention to prepare a new water soluble polyester.

Another object is to improve such a polyester coating with the addition of hydroxymethylated diacetone acrylamide.

A further object is to prepare an improved polyester by the addition of hydroxymethylated diacetone acrylamide and a water soluble organic titanate.

An additional object is to prepare a polyester coating with improved heat shock and cut-through properties.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modification within the spirit and scope of the invention will become apparent to those skilled in the art from their detailed description.

These objects are attained by mixing together (1) a water soluble polyester which is a condensation product of (a) a tribasic carboxylic acid, (b) an aromatic dicarboxylic acid which can be replaced in part by an aliphatic or cycloaliphatic dibasic acid and (c) a dihydric alcohol; (2) hydroxymethylated diacetone acrylamide (HMDAA — a trademark of Lubrizol Corp.), as a crosslinking agent, and (3) a water soluble organic titanate may be added to the mixture in order to improve cut-through properties of the coating. A synergistic effect has been found when both (2) and (3) are present.

It is critical to have at least a predominant amount of aromatic dicarboxylic acid such as terephthalic acid or a combination of terephthalic acid and isophthalic acid since it is only when the aromatic dicarboxylic acid predominates that substantial improvements in heat shocks and especially in cut-throughs are obtained to satisfy a Class F rating.

The new composition of the present invention is applied to a silver, copper or any other metal wire by an aqueous solution containing the water soluble polyester, HMDAA and the water soluble organic titanate. The present composition can be sold on a dry basis or in an aqueous solution. The concentrations of the total solids (polyester, HMDAA and titanate) in the aqueous solution is not critical.

One or more tribasic acids (including anhydrides of such acids) may be employed alone or in combination with a tetrabasic acid. Some suitable acids which are useful in the present invention are as follows:

Triacids — Trimellitic acid or preferably its anhydride, trimesic acid, hemimellitic acid, tris (carboxyethyl) isocyanurate, nitrilotriacetic acid, etc.;

Tetra acids — Pyromellitic acid or anhydride, benzophenone tetracarboxylic acid or anhydride, cyclopentane tetracarboxylic acid or anhydride, etc.

The preferred tribasic acid is trimellitic anhydride.

For the dicarboxylic acid, one or more aromatic dicarboxylic acids (including anhydrides of such acids) or a combination of an aliphatic or cycloaliphatic acid (or anhydride thereof) and the aromatic acid may be employed. Some suitable acids are as follows:

Carboxylic Acids

Diacids a. Aliphatic — succinic acid, glutaric acid, adipic acid, pimelic acid, suberic acid, azelaic acid, sebacic acid, diglycolic acid, 1,12-dodecanoic acid, tetrapropenyl succinic anhydride, maleic acid and its anhydride, fumaric acid, itaconic acid and its anhydride, malic acid, etc.

b. Cycloaliphatic — tetrahydrophthalic anhydride, hexahydrophthalic anhydride, 1,4-cyclohexanedicarboxylic acid, etc.

c. Aromatic — phthalic acid, phthalic anhydride, isophthalic acid, terephthalic acid, benzophenone dicarboxylic acid, diphenic acid, 4,4'-dicarboxydiphenyl ether, 2,5-pyridine dicarboxylic acid, etc.

The preferred aromatic dicarboxylic acids are isophthalic acid, terephthalic acid, and the preferred aliphatic acid is maleic anhydride.

One or more dihydric alcohols may be used alone or in combination with other triols or higher polyhydric alcohols. Alcohols that may be employed in the preparation of the polyester are:

Diols-ethylene glycol, propylene glycol, 1-3 butylene glycol, 1,5-pentanediol, 1,6-hexanediol, neopentyl glycol, diethylene glycol, dipropylene glycol, 1,3-hydroxyethyl-5,5-dimethylhydantoin, 1,4-cyclohexanedimethanol, 1,4-cyclohexanediol, hydrogenated bisphenol A (hydrogenated isopropylidene diphenol) Union Carbide's "Ester Diol 204, (2,2-dimethyl-3-hydroxyscopyl 2,2-dimethyl-3-hydroxypropionate)" Dow 565 (diether of propylene glycol and Bisphenol A), Carbowax 150 (polyethylene glycol with avg. MW of 150), Carbowax 1500 (Polyethylene glycol molecular weight average 1500 and is a blend of equal parts of Carbowax 300 and Carbowax 1540), etc.

Triols —glycerine, trimethylolethane, trimethylolpropane, trishydroxyethyl isocyanurate (THEIC), 1,2,6-hexanetriol, polyether triol (avg. mol. wt. 230 ethoxylated or propoxylated glycerine), etc.

Higher Polyols — pentaerythritol, dipentaerythritol, tripentaerythritol, Monsanto's RJ-100 (styreneallyl alcohol copolymer with avg. mol. wt. 1600), etc.

The preferred alcohols are ethylene glycol, 1,3-hydroxyethyl-5,5-dimethylhydantoin, 1,6-hexanediol, diethylene glycol, and THEIC.

The organic titanate may be a chelate such as a tetra triethanolamine chelate of titanium, available in a 50% aqueous solution as Tyzor TE from duPont. Illustrative of another suitable water soluble titanate is Tyzor LA which is lactate ammonium salt chelate of titanium (50% aqueous solution). Tyzor LA is the preferred organic titanate.

The HMDAA is a hydroxymethylated derivative of diacetone acylamide. The diacetone acrylamide, also known as N-3-oxohydrocarbon-substituted acrylamide, is described in Coleman, U.S. Pat. No. 3,277,056. The hydroxymethyl groups are attached to the carbon atoms alpha to the keto carbonyl. Further properties of HMDAA are described in a brochure entitled "HMDAA Monomer" published by the Lubrizol Corporation. Unless otherwise stated all parts and percentages are by weight. The concentrations of HMDAA may be from 0.1 to 6 weight percent or even up to 10 percent based on a dry weight of the total solids, including the polyester. The water soluble organic titanate may be from 0.5 to 10 weight percent based on the dry weight of the total solids, including the polyester. On a preferred basis the ratio of the organic titanate to the HMDAA on a dry solids basis would be 7 to 25 percent of the titanate to 93–75 percent of HMDAA.

In the preparation of the polyester, the proportions of the alcohols to the acids have been calculated on equivalents of hydroxyl and carboxyl groups. The proportion is not critical and one skilled in the art can determine the proportion for various uses. The preferred range is an excess of hydroxyl groups over carboxyl groups by an amount ranging from 10 to 50 percent. A more preferred excess hydroxyl content is 20 to 35 percent.

The molar ratio of the primary tribasic acid (when employed) i.e. that tribasic acid which has a greater molar concentration than any other tribasic or tetrabasic acid, to the other acids, including the dicarboxylic acids, and other tribasic and tetrabasic acids is usually in the range from 25/75 to 85/15. Of course there can be used the primary tribasic acid itself without any other tribasic or tetrabasic acid. The term acid is intended to cover anhydrides when they exist.

The amount of alcohols may be entirely one of more dihydric alcohols or a combination of dihydric alcohols and triols or higher polyhydric alcohols. If a combination of alcohols is used, one skilled in the art can easily determine the proper proportion of each since it is not critical. The preferred ratio of dihydric alcohols to triols or higher polyhydric alcohols is in the range of 97/3 to 65/35 on a molar basis. The trihydric alcohol can be omitted, particularly if a tribasic acid is employed as a part of the acid.

The amount of aliphatic and cycloaliphatic dicarboxylic acid can be 0 to 0.50 moles per mole of aromatic dicarboxylic acid. If present, the aliphatic or cycloaliphatic dicarboxylic acid can be as little as 0.01 mole per mole of aromatic dicarboxylic acid. The preferred range of aliphatic and cycloaliphatic acid is 0 to 0.30 mole per mole of aromatic dicarboxylic acid.

Per mole of total dicarboxylic acid there are usually employed 1.87 to 4.91 moles of diol (dihydric alcohol) and 0.33 to 1.86 moles of tricarboxylic acid.

The use of the HMDAA and water soluble titanates is critical. Other cross-linkers such as water-soluble aminoplasts cause blistering during application on wire and even where the coated wire is barely acceptable considerable weight loss is experienced during heat aging. Water soluble phenolic resins cause considerable embrittlement of the wire so that it does not pass the snap test in any reasonable mandrel after snap test.

As stated above, the HMDAA and water soluble titanates act as a synergestic combination of cross-linking agents. This can be seen from the illustrative example below.

Examples 1–11 disclose various methods for making the polyester component of the composition.

Example 1

| Reactants | Weight Grams | Mols. |
|---|---|---|
| (A) Ethylene Glycol | 543 | 8.76 |
| (B) 1,3-Hydroxyethyl -5,5 dimethylhydantion | 337 | 1.56 |
| (C) Isophthalic Acid | 349 | 2.10 |
| (D) Nitrilo triacetic Acid | 29 | 0.15 |
| (E) Trimellitic Anhydride | 720 | 3.75 |

Materials A, B, C and D were charged into a 5 liter, three-neck flask equipped with agitator, gas inlet tube, thermometers for flask and distilling head, 3-bubble cap Snyder fractionating column and water-cooled condenser. Prior to heating the flask's contents nitrogen was sparged into the flask for 15–30 minutes to displace the air present, and continued throughout the course of the esterification process. Heat was applied and the batch temperature was gradually raised to 360°–410°F. in a matter of 2 to 4 hours. More importantly, the distilling head temperature was controlled at 200°–212°F. to minimize glycol losses.

The batch was held until the resin melt was a clear hot melt and 65–75 mls. of distillate had been collected. The contents were allowed to cool to 300°F., and material E was added to the flask. After replacing the Snyder column and distilling head with a Dean-Stark water trap heat was reapplied and the temperature raised to a range of 330°–350°F. It was maintained at that top temperature range and sampled periodically for viscosity and acid number. The polyester was controlled to a final viscosity of B-E on the Gardner-Holdt scale at 50 percent solids in methyl cellosolve acetate. The acid number of the solution was between 30 and 40.

When this end point was reached the contents were cooled to 200°–220°F. and a mixture of ammonium hydroxide (28–30% $NH_3$) and deionized water was carefully added to the flask by means of a dropping funnel. It was adjusted to a viscosity of U½-W on the Gardner-Holdt scale and a pH 7.5–8.5 with the requisite amount of ammonia and water.

Example 2

| Reactants | Weight Grams | Mols. |
|---|---|---|
| (A) Ethylene Glycol | 536 | 8.64 |
| (B) 1,6-Hexanediol | 177 | 1.50 |
| (C) Terephthalic Acid | 338 | 2.04 |
| (D) Dibutyl Tin Oxide | 2.2 | |
| (E) Isophthalic Acid | 60 | 0.36 |

Example 2-continued

| Reactants | Weight Grams | Mols. |
|---|---|---|
| (F) Trimellitic Anhydride | 691 | 3.60 |

The same equipment was used as in Example 1, except for the elimination of a nitrogen sparge in the first stage of the reaction. Materials A, B, C and D which is employed as a catalyst, were raised to 380°–410°F. and maintained there until the hot melt was clear, and 60–70 mls. of distillate had been collected.

The batch was cooled to 350°F. and material E was added. At this juncture the flask was sparged with nitrogen, and temperature raised again to 380°–420°F. After collecting another 10–15 mls. of distillate the contents were cooled again to 300°F.

Material F was added at 300°F. or less. After replacing the Snyder column and distilling head with a water trap heat was reapplied and the temperature raised to a range of 330°–350°F.

The batch was monitored at periodic intervals and controlled to a final viscosity of B-E on the Gardner-Holdt scale at 50 percent solids in methyl cellosolve acetate (MCA). The acid number of the solution was between 30 and 40.

The molten resin at 200°–220°F. was subsequently diluted with deionized water and ammonium hydroxide to a final viscosity of S-T and pH of 7.6.

Example 3

| Reactants | Weight Grams | Mols. |
|---|---|---|
| (A) Ethylene Glycol | 524 | 8.46 |
| (B) 1,6-Hexanediol | 177 | 1.50 |
| (C) Isophthalic Acid | 448 | 2.70 |
| (D) Trimellitic Anhydride | 634 | 3.30 |

The same equipment and procedure were employed as detailed in Example 1. After 75–85 mls. distillate were collected in the initial stage material "D" was charged to the flask, reaction was continued to a final viscosity of A-D and acid number of 25–35 at 50 percent solids in methyl cellosolve acetate (MCA).

An aqueous solution was prepared in the same manner as in Example 1 and adjusted to the same viscosity and pH ranges as in that example with a dilute ammoniacal solution.

Example 4

| Reactants | Weight Grams | Mols. |
|---|---|---|
| (A) Ethylene Glycol | 483 | 7.80 |
| (B) Diethylene Glycol | 166 | 1.56 |
| (C) Terephthalic Acid | 398 | 2.40 |
| (D) Dibutyl Tin Oxide | 0.5 | |
| (E) Isophthalic Acid | 200 | 1.20 |
| (F) Trimellitic Anhydride | 461 | 2.40 |

The same equipment and procedure were employed as detailed in Example 2. In the initial stage of the cook with materials A, B, C and D the reaction was regulated to a point where 80 mls. distillate was collected.

After the addition of material E another 40 mls. distillate were collected in this second or intermediate stage.

Material F was added at 300°F., and the reaction brought to completion at a final viscosity of A-C and an acid number of 25–35 at 50 percent solids in MCA.

An aqueous solution was prepared in the same manner as described in Example 1 as to viscosity, pH and solubilizing agent employed.

Example 5

| Reactants | Weight Grams | Mols. |
|---|---|---|
| (A) Ethylene Glycol | 502 | 8.10 |
| (B) Diethylene Glycol | 134 | 1.26 |
| (C) Terephthalic Acid | 548 | 3.30 |
| (D) Dibutyl Tin Oxide | 0.25 | |
| (E) Isophthalic Acid | 50 | 0.30 |
| (F) Trimellitic Anhydride | 461 | 2.40 |

The same equipment and procedure were employed as detailed in Example 2. Materials A, B, C and D were charged to flask, and temperature slowly raised to 390°–430°F. Reaction was continued until 98 mls. of distillate had been collected.

The contents were cooled to 350°F., and material E was added. A nitrogen sparge was used at this point, and esterification resumed. After 10–20 mls. additional distillate had been collected, the contents were cooled again to 300°F.

Material "F" was added at 300°F., and heat was applied again. The temperature was maintained at 345°–365°F. until a viscosity of A-D and an acid no. of 25–35 at 50 percent solids in MCA was attained.

An aqueous solution was prepared in the same manner as described in Example 1 as to viscosity, pH and solubilizing agent employed.

Example 6

| Reactants | Weight Grams | Mols. |
|---|---|---|
| (A) Ethylene Glycol | 491 | 7.92 |
| (B) Diethylene Glycol | 134 | 1.26 |
| (C) Terephthalic Acid | 249 | 1.50 |
| (D) Dibutyl Tin Oxide | 0.25 | |
| (E) Terephthalic Acid | 248 | 1.50 |
| (F) Trimellitic Anhydride | 403 | 2.10 |
| (G) Maleic Anhydride | 88 | 0.90 |

The same equipment and procedure were employed as detailed in Example 2. In the initial stage of the reaction 40–50 mls. of distillate were collected. After the second stage another 50–60 mls. distillate were obtained.

In the final step the product was carried to a final viscosity of A-C and an acid no. of 26–34 at 50 percent solids in MCA.

The molten resin was solubilized in water and ammonium hydroxide in the same manner as described in Example 1.

Example 7

| Reactants | Weight Grams | Mols. |
|---|---|---|
| (A) Ethylene Glycol | 521 | 8.40 |
| (B) Diethylene Glycol | 193 | 1.82 |
| (C) Terephthalic Acid | 349 | 2.10 |
| (D) Dibutyl Tin Oxide | 0.25 | |
| (E) Terephthalic Acid | 348 | 2.10 |
| (F) Trimellitic Anhydride | 336 | 1.75 |
| (G) Maleic Anhydride | 103 | 1.05 |

The same reaction conditions and equipment were employed as in Examples 2 and 6. Seventy mls. distillate were obtained in the first step of the process. Another 64 mls. distillate were collected in the second step.

In the final step the reaction was stopped when a viscosity of A and an acid no. 25–29 at 50 percent NVM [non-volatile materials] in MCA were achieved.

For the preparation of the aqueous solution using this polymer base consult Example 1.

Example 8

| Reactants | Weight Grams | Mols. |
| --- | --- | --- |
| (A) Ethylene Glycol | 442 | 7.14 |
| (B) Diethylene Glycol | 193 | 1.82 |
| (C) Terephthalic Acid | 349 | 2.10 |
| (D) Dibutyl Tin Oxide | 0.25 | |
| (E) Terephthalic Acid | 348 | 2.10 |
| (F) Trimellitic Anhydride | 336 | 1.75 |
| (G) Maleic Anhydride | 103 | 1.05 |
| (H) Glycerine (96%) | 81 | 0.84 |

The same equipment and reaction conditions were used as in Examples 2, 6 and 7. In the first stage 64 mls. distillate were collected. Another 71 mls. distillate were obtained in the second stage. In the third and final stage, the reaction was terminated at a viscosity of B and an acid no. 30.5 at 50 percent NVM in MCA.

Its aqueous solution was prepared in the same manner as described in Example 1.

Example 9

| Reactants | Weight Grams | Mols. |
| --- | --- | --- |
| (A) Ethylene Glycol | 442 | 7.14 |
| (B) Diethylene Glycol | 193 | 1.82 |
| (C) Terephthalic Acid | 349 | 2.10 |
| (D) Dibutyl Tin Oxide | 0.25 | |
| (E) Terephthalic Acid | 348 | 2.10 |
| (F) Trimellitic Anhydride | 336 | 1.75 |
| (G) Maleic Anhydride | 103 | 1.05 |
| (H) Trishydroxyethyl isocyanurate | 219 | 0.84 |

Formulation of this example was similar to Example 8, except for the replacement of glycerine with tris(hydroxyethyl) isocyanurate. The reaction conditions and equipment were the same as in Examples 2 and 8.

The final constants achieved for this polyester base were a viscosity of A ½ and an acid no. of 30.8 at 50 percent solids in MCA.

Its aqueous solution was prepared in the same manner as described in Example 1.

Example 10

| Reactants | Weight Grams | Mols. | Equivalents |
| --- | --- | --- | --- |
| (A) Ethylene Glycol | 498 | 8.04 | 16.08 |
| (B) Diethylene Glycol | 159 | 1.50 | 3.00 |
| (C) Terephthalic Acid | 249 | 1.50 | 3.00 |
| (D) Dibutyl Tin Oxide | 0.25 | | |
| (E) Terephthalic Acid | 249 | 1.50 | 3.00 |
| (F) Pyromellitic Dianhydride | 131 | 0.60 | 2.40 |
| (G) Trimellitic Anhydride | 288 | 1.50 | 4.50 |
| (H) Maleic Anhydride | 88 | 0.90 | 1.80 |

The same equipment and procedure were employed as detailed in Example 2. In the initial stage of the reaction 40–50 mls. of distillate was collected. After the second stage, another 42–48 mls. of distillate were obtained.

Material "F" was added at 300°F., and the temperature raised to 400°F. in two hours. A top temperature of 400°–410°F. was maintained until an additional 10–15 mls. of distillate was collected.

After cooling to 300°F. materials "G" and "H" were charged to the reaction vessel. The Snyder column was removed, and replaced with a Dean-Stark water trap connected to a water-cooled condenser. Also, a gas inlet tube was attached to a side neck and the batch was slowly sparged with nitrogen.

In two hours the temperature was raised to 350°–360°F. It was maintained at that top temperature range, and monitored periodically for viscosity and acid number. The polyester was controlled to a final viscosity of F-G on the Gardner-Holdt scale at 50 percent solids in methyl cellosolve acetate (MCA). The acid number of the solution was 28.

The molten resin at 200°–220°F. was subsequently diluted with deionized water and ammonium hydroxide to a final viscosity of V ½, pH of 8.1 and solids of 22.5 percent.

Example 11

| Reactants | Weight Grams | Mols. | Equivalents |
| --- | --- | --- | --- |
| (A) Ethylene Glycol | 498 | 8.04 | 16.08 |
| (B) Diethylene Glycol | 159 | 1.50 | 3.00 |
| (C) Terephthalic Acid | 249 | 1.50 | 3.00 |
| (D) Dibutyl Tin Oxide | 0.25 | | |
| (E) Terephthalic Acid | 249 | 1.50 | 3.00 |
| (F) Benzophenone Tetra-carboxylic Dianhydride | 193 | 0.60 | 2.40 |
| (G) Trimellitic Anhydride | 288 | 1.50 | 4.50 |
| (H) Maleic Anhydride | 88 | 0.90 | 1.80 |

The same equipment and procedure were employed as detailed in Examples 2 and 10. In the first and second stages of reaction or esterification of terephthalic acid with the mixed glycols the quantities of distillate were similar to that cited in Example 10.

Material "F" was added at 300°F., and the temperature increased to 400°F. in two hours. This top temperature was held until an additional 10–15 mls. of distillate was collected.

Materials "G" and "H" were charged to the flask at 300°F., and reacted in similar fashion to these same materials in Example 10.

The reaction was regulated by monitoring the viscosity and acid number of the polymer formed. After attaining a viscosity of B-C and an acid value of 31.9 percent at 50 percent solids in MCA, the molten resin was cooled to 220°F., and solubilized in dilute ammoniacal water.

The aqueous solution was adjusted to a viscosity of V ½, a pH of 7.95 and a solids content of 32%.

Table A summarizes the moles of acids used in Examples 1 to 11.

Table A

Molar Ratios of Aromatic to Aliphatic Dicarboxylic Acids in Polyester Compositions.

| Example No. | Total Moles of Aromatic Diacids | | Total Moles of Aliphatic Diacids | Mole % of Total Diacids | | |
|---|---|---|---|---|---|---|
| | TPA | IPA | MA | TPA | IPA | MA |
| 1 | 0 | 2.10 | 0 | 0 | 100 | 0 |
| 2 | 2.04 | 0.36 | 0 | 85 | 15 | 0 |
| 3 | 0 | 2.70 | 0 | 0 | 100 | 0 |
| 4 | 2.40 | 1.20 | 0 | 66⅔ | 33⅓ | 0 |
| 5 | 3.30 | 0.30 | 0 | 91.7 | 8.3 | 0 |
| 6 | 3.00 | 0 | 0.90 | 76.9 | 0 | 23.1 |
| 7 | 4.20 | 0 | 1.05 | 80 | 0 | 20 |
| 8 | 4.20 | 0 | 1.05 | 80 | 0 | 20 |
| 9 | 4.20 | 0 | 1.05 | 80 | 0 | 20 |
| 10 | 6.00 | 0 | 1.80 | 76.9 | 0 | 23.1 |
| 11 | 6.00 | 0 | 1.80 | 76.9 | 0 | 23.1 |

Legend
TPA: Terephthalic Acid
IPA: Isophthalic Acid
MA: Maleic Anhydride

The heat shock test employed in the following tables uses the conventional test published in NEMA Standards Publication MW-1000-1973, ANSI C9. 100-1973 Magnetic Wire Section, Part 3 — Test Procedures, page 4, Test 4, 1.1.

The following tables disclose the improved properties of the enamel coating when the polyester is combined with a combination of HMDAA and a water soluble organic titanate.

Table I

| Enamel Nos. | Parts by Weight | | |
|---|---|---|---|
| | 1 | 2 | 3 |
| Polyester of Example 3 | 630 | | |
| Aqueous Soln. of Ex. 3 (Enamel No. 1) | | 650 | 650 |
| Water (deionized) | 1315 | | |
| Ammonium Hydroxide (28% NH₃) | 48 | | |
| HMDAA | | 11.55 | 23.8 |
| Solution Characteristics | | | |
| Viscosity (Gardner-Holdt Scale) | V ¼ | U ½ | U ½ |
| pH | 7.99 | 7.65 | 7.6 |
| % Solids | 31.6 | 31.85 | 32.4 |
| % Crosslinker (on a total solids basis) | 0 | 3 | 6 |

(over AWG No. 18 Copper Wire coated with 2 mils, polyester base and 1 mil nylon top coat)

| Enamel Nos. | Wire Properties | | |
|---|---|---|---|
| | 1 | 2 | 3 |
| Heat Shock, 1X mandrel 30 mins. at 175°C | 0 | 0 | 0 |
| 2X mandrel | 40 | 90 | 90 |
| 3X mandrel | 90 | 100 | 80 |
| 20% pre-stretch 4X mandrel | 100 | 100 | 100 |
| Cut-through Temp., °C. | 182–193 | 198–210 | 167–172 |

To further demonstrate the combined effect of HMDAA and Tyzor LA as cross-linking agents toward the improvement of both heat shock and cut-through characteristics of the unmodified enamel prepared from the base of Example 7. For details consult Table II.

Table II

| Enamel Nos. | Pts. by Wt. | | |
|---|---|---|---|
| | 4 | 5 | 6 |
| Polyester of Example 7 | 840 | | |
| Aqueous Soln. of Ex. 7 (Enamel No. 1) | | 600 | 600 |
| Water (deionized) | 1490 | | |
| Ammonium Hydroxide (28 % NH₃) | 65 | | |
| HMDAA | | 11.63 | 11.63 |
| Tyzor LA | | 2.24 | 4.4 |
| Solution Characteristics | | | |
| Viscosity (Gardner-Holdt Scale) | v ¼ | V | V ½ |
| pH | 8.0 | 7.51 | 7.75 |
| % Solids | 35.1 | 35.5 | 35.6 |
| % Crosslinker, HMDAA | | 3 | 3 |
| Tyzor LA | | 0.5 | 1 |

(over AWG No. 18 copper wire base coat: 2 mils of Enamel top coat: 1 mil Nylon 6, 6)

| Enamel Nos. | Wire Properties | | |
|---|---|---|---|
| | 4 | 5 | 6 |
| Heat Shock 1X mandrel | 80 | 20 | 10 |
| 2X mandrel | 100 | 80 | 80 |
| 3X mandrel | 100 | 100 | 90 |
| 4X mandrel | 100 | 100 | 100 |
| Cut-Through Temp. °C. | 162–185 | 230–235 | 215–240 |

In order to show the superiority of the use of both hydroxymethylated diacetone acrylamide (HMDAA) and a water soluble organic titanate as cross-linking agents in preparing a wire enamel from a water soluble polyester experiments were carried out as set forth in Table III.

Table III

| Enamel Nos. | 1 | 2 | 3 | 4 |
|---|---|---|---|---|
| Polyester of Example 4 | 840 | | | |
| Aqueous Soln. of Ex. 4 (Enamel No. 1) | | 550 | 550 | 550 |
| Water (deionized) | 1650 | | | |
| Ammonium Hydroxide | 70 | | | |
| HMDAA | | 10.15 | | 10.15 |
| Tyzor LA | | | 3.65 | 3.90 |
| Solution Characteristics | 1 | 2 | 3 | 4 |
| Viscosity (Gardner-Holdt Scale) | V | U¼ | V½ | V½ |
| pH | 8.30 | 7.73 | 7.75 | 7.87 |
| % Solids | 32.0 | 33.1 | 33.0 | 33.3 |
| % Crosslinker (on a total solids basis) | 0 | 3 | 1 | 4 |

Table III-continued

| Specific Gravity, 25°C. Wire Properties | | 1.095 | 1.095 (Over AWG No. 18 Copper Wire coated with 2 mils polyester base and 1 mil Nylon topcoat) | 1.095 | 1.095 |
|---|---|---|---|---|---|
| Enamel Nos. | | 1 | 2 | 3 | 4 |
| Heat Shocks: | 1X mandrel | 0 | 20 | 10 | 10 |
| 30 min at 175°C | 2X mandrel | 60 | 30 | 30 | 40 |
| 20% pre-stretch | 3X mandrel | 70 | 60 | 30 | 80 |
| | 4X mandrel | 90 | 70 | 70 | 100 |
| Cut-Through Temp., °C. | | 151–180 | 135–140 | 208–215 | 210–218 |
| Speed, ft./min. | | 50 | 50 | 50 | 50 |
| Appearance | | 3 | 3 | 3 | 3 |
| Mandrel, after snap | | 1X | 1X | 1X | 1X |

It will be observed that in the tables enamels 1 and 4 of Table II had no cross-linking agents present and thus had poorer heat shocks and much poorer cut-throughs than enamels 5 and 6 which have the cross-linking agents or curatives, as can be seen also in comparing enamels 1 and 4 in Table III.

Table I demonstrates that when only HMDAA is employed at the 3 percent level of cross-linking agent there is some improvement in cut-throughs and heat shocks but at the 6 percent level of HMDAA in Example 3 there is a precipitous drop in cut-throughs while maintaining the heat shocks. Thus HMDAA alone falls short.

The products can comprise, consist of or consist essentially of the materials set forth.

What is claimed is:

1. A composition comprising:
   1. A water-soluble polyester which is a condensation product of a polycarboxylic acid and a polyhydric alcohol said polycarboxylic acid comprising (a) a tribasic carboxylic acid and (b) an aromatic dicarboxylic acid with 0 to 0.50 mol of an aliphatic or cycloaliphatic dicarboxylic acid per mol of the aromatic dicarboxylic acid, said polyhydric alcohol comprising a dihydric alcohol, the molar ratio of tribasic carboxylic acid to the other acids present being from 25/75 to 85/15, there being present an excess of hydroxyl groups over carboxyl groups in said polyester in the range of 10 to 5 percent,
   2. hydroxymethylated diacetone acrylamide in an amount of 0.1 to 10 percent by weight of the total solids as a cross-linking agent for said polyester, and
   3. 0.5 to 10 percent by weight of the total solids of a water soluble organic titanate as a synergistic cross-linker with (2).

2. The composition of claim 1 wherein the tribasic carboxylic acid is selected from the group consisting of trimellitic acid, trimellitic anhydride, trimesic acid, hemimellitic acid, tris (carboxyethyl) isocyanurate and nitrilotriacetic acid.

3. The composition of claim 1 wherein the amount of aliphatic and cycloaliphatic dicarboxylic acid is 0.

4. The composition of claim 1 wherein the amount of aliphatic and cycloaliphatic dicarboxylic acid is 0.01 to 50 mol per mol of aromatic dicarboxylic acid.

5. The composition of claim 1 wherein the organic titanate is selected from the group consisting of triethanolamine chelate of titanium and the lactate ammonium salt chelate of titanium.

6. The composition of claim 1 wherein the polybasic acid component of the water-soluble polyester includes a tetracarboxylic acid from the group consisting of pyromellitic acid, pyromellitic anhydride, benzophenone tetracarboxylic acid, benzophenone tetracarboxylic anhydride, cyclopentane tetracarboxylic acid and cyclopentane tetracarboxylic anhydride.

7. The composition of claim 1 wherein the polyhydric alcohol component of the polyester includes a polyhydric alcohol having at least three hydroxyl groups and selected from the group consisting of glycerine, trimethylolethane, trimethylol propane, tris(hydroxyethyl) isocyanurate, 1,2,6-hexanetriol, ethoxylated glycerine, propoxylated glycerine, pentaerythritol, dipentaerythritol and styrene-allyl alcohol copolymer.

8. The composition according to claim 2 wherein the range of excess hydroxyl groups is 20 to 35 percent.

9. The composition according to claim 1 wherein the tribasic carboxylic acid is selected from the group consisting of:
   trimellitic acid, trimellitic anhydride, trimesic acid, hemimellitic acid, tris(carboxyethyl) isocyanurate, and nitrilotriacetic acid;
   the aliphatic or cycloaliphatic dicarboxylic acid is selected from the group consisting of:
   succinic acid, glutaric acid, adipic acid, pimelic acid, suberic acid, azelaic acid, sebacic acid, diglycolic acid, 1,12-dodecanoic acid, tetrapropenyl succinic anhydride, maleic acid, maleic anhydride, fumaric, itaconic acid itaconic anhydride, malic acid, tetrahydrophthalic anhydride, hexahydrophthalic anhydride, 1,4-cyclohexanedicarboxylic acid;
   the aromatic dicarboxylic acid is selected from the group consisting of:
   phthalic anhydride, phthalic acid, isophthalic acid, terephthalic acid, benzophenone dicarboxylic acid, diphenic, 4,4-dicarboxydiphenyl ether, and 2,5-pyridine dicarboxylic acid;
   and the dihydric alcohol is selected from the group consisting of:
   ethylene glycol, propylene glycol, 1-3 butylene glycol, 1,5-pentanediol, 1,6-hexanediol, neopentyl glycol, diethylene glycol, dipropylene glycol, 1,3-hydroxyethyl-5,5-dimethylhydantoin, 1,4-cyclohexanedimethanol, 1,4-cyclohexanediol, hydrogenated isopropylidene diphenol, 2,2-dimethyl-3-hydroxypropyl 2,2-dimethyl-3-hydroxypropionate, diether of propylene glycol and hydrogenated isopropylidene diphenol, and polyethylene glycol.

10. An aqueous solution comprising water and the composition according to claim 9.

11. The composition according to claim 9 wherein the water soluble polyester includes a tetrabasic carboxylic acid.

12. The composition according to claim 9 wherein the water soluble polyester includes a polyhydric alcohol having at least three hydroxyls.

13. The composition of claim 9 wherein the aromatic dicarboxylic acid is terephthalic acid or a mixture of terephthalic acid and isophthalic acid.

14. The composition according to claim 13 wherein the organic titanate is selected from the group consisting of triethanolamine chelate of titanium and lactate ammonium salt chelate of titanium.

15. The composition according to claim 13 wherein the aromatic dicarboxylic acid is terephthalic acid.

16. The composition according to claim 15 wherein the hydroxymethylated diacetone acrylamide comprises 0.1 to 6 percent by weight of the total solids.

17. The compositions according to claim 16 wherein in the ratio between the hydroxymethylated diacetone acrylamide and organite titanate on a dry solids basis is in the range of 7 to 25 percent of the titanate and 75–93 percent of the hydroxymethylated diacetone acrylamide.

18. The composition of claim 13 wherein the tricarboxylic acid is trimellitic anhydride.

19. The composition according to claim 10 wherein the tribasic carboxylic acid is selected from the group consisting of trimellitic anhydride and nitrilotriacetic acid, the aliphatic or cycloaliphatic dicarboxylic acid is present and is maleic anhydride, and the dihydric alcohol is selected from the group consisting of 1,3-hydroxyethyl-5,5-dimethylhydantoin, ethylene glycol, 1,6-hexandiol and diethylene glycol.

20. A composition according to claim 19 wherein the polyester includes a trihydric alcohol selected from the group consisting of glycerin and tris(hydroxyethyl) isocyanurate.

21. The composition according to claim 19 wherein the hydroxymethylated diacetone acrylamide comprises 3 to 6 percent by weight of the total solids.

22. An aqueous solution comprising water and the composition according to claim 19.

* * * * *